United States Patent
Coeck et al.

(10) Patent No.: US 11,040,492 B2
(45) Date of Patent: Jun. 22, 2021

(54) SYSTEM AND METHOD FOR MONITORING AND RECOATING IN AN ADDITIVE MANUFACTURING ENVIRONMENT

(71) Applicant: MATERIALISE N.V., Leuven (BE)

(72) Inventors: Sam Coeck, Leuven (BE); Piet Van Den Ecker, Leuven (BE); Michel Janssens, Leuven (BE); Tom Craeghs, Leuven (BE)

(73) Assignee: MATERIALISE N.V., Leuven (BE)

( * ) Notice: Subject to any disclaimer, the term of this patent is extended or adjusted under 35 U.S.C. 154(b) by 698 days.

(21) Appl. No.: 15/565,939

(22) PCT Filed: Apr. 12, 2016

(86) PCT No.: PCT/US2016/027085
§ 371 (c)(1),
(2) Date: Oct. 12, 2017

(87) PCT Pub. No.: WO2016/168172
PCT Pub. Date: Oct. 20, 2016

(65) Prior Publication Data
US 2018/0050494 A1 Feb. 22, 2018

Related U.S. Application Data

(60) Provisional application No. 62/146,871, filed on Apr. 13, 2015.

(51) Int. Cl.
*B29C 64/393* (2017.01)
*B33Y 50/02* (2015.01)
(Continued)

(52) U.S. Cl.
CPC ............ *B29C 64/393* (2017.08); *B22F 10/20* (2021.01); *B29C 64/153* (2017.08); *B33Y 10/00* (2014.12);
(Continued)

(58) Field of Classification Search
None
See application file for complete search history.

(56) References Cited

U.S. PATENT DOCUMENTS 6,930,278 B1 * 8/2005 Chung .................. B33Y 30/00
219/121.85
2012/0004649 A1 1/2012 Schnitzler
2012/0100031 A1 4/2012 Ljungblad

FOREIGN PATENT DOCUMENTS

JP 06-320532 A 11/1994
JP 2011-006719 A 1/2011
(Continued)

OTHER PUBLICATIONS

International Search Report issued in PCT/US2016/027085, dated Aug. 4, 2016.

*Primary Examiner* — Monica A Huson
*Assistant Examiner* — Kelsey C Grace
(74) *Attorney, Agent, or Firm* — Patterson + Sheridan, LLP

(57) ABSTRACT

A system (100) and method for monitoring a recoating mechanism (415A, 415B) in an additive manufacturing environment is provided. Various embodiments involve the use of a control computer (102a-102d) to receive data based on a thermal image of a recoating mechanism (415A, 415B) from an imaging device (436) configured to capture thermal image. The control computer (102a-102d) further determines a value of a property of the thermal image, wherein the property is related to an amount of powder in the recoating mechanism. The control computer (102a-102d) further determines at least one of if the value indicates an error related to the amount of powder in the recoating mechanism (415A, 415B), and an action to take with respect to the recoating mechanism (415A, 415B) that is based on the value.

10 Claims, 16 Drawing Sheets

(51) Int. Cl.
*B33Y 10/00* (2015.01)
*B29C 64/153* (2017.01)
*B22F 10/20* (2021.01)
*B33Y 30/00* (2015.01)
*B22F 10/30* (2021.01)

(52) U.S. Cl.
CPC ............... *B33Y 30/00* (2014.12); *B33Y 50/02* (2014.12); *B22F 10/30* (2021.01); *B22F 2999/00* (2013.01); *Y02P 10/25* (2015.11)

(56) References Cited

FOREIGN PATENT DOCUMENTS

| | | |
|---|---|---|
| JP | 2012-520091 A | 9/2012 |
| JP | 2012-533682 A | 12/2012 |
| WO | 2014/095200 A1 | 6/2014 |
| WO | 2015/040185 A1 | 3/2015 |

* cited by examiner

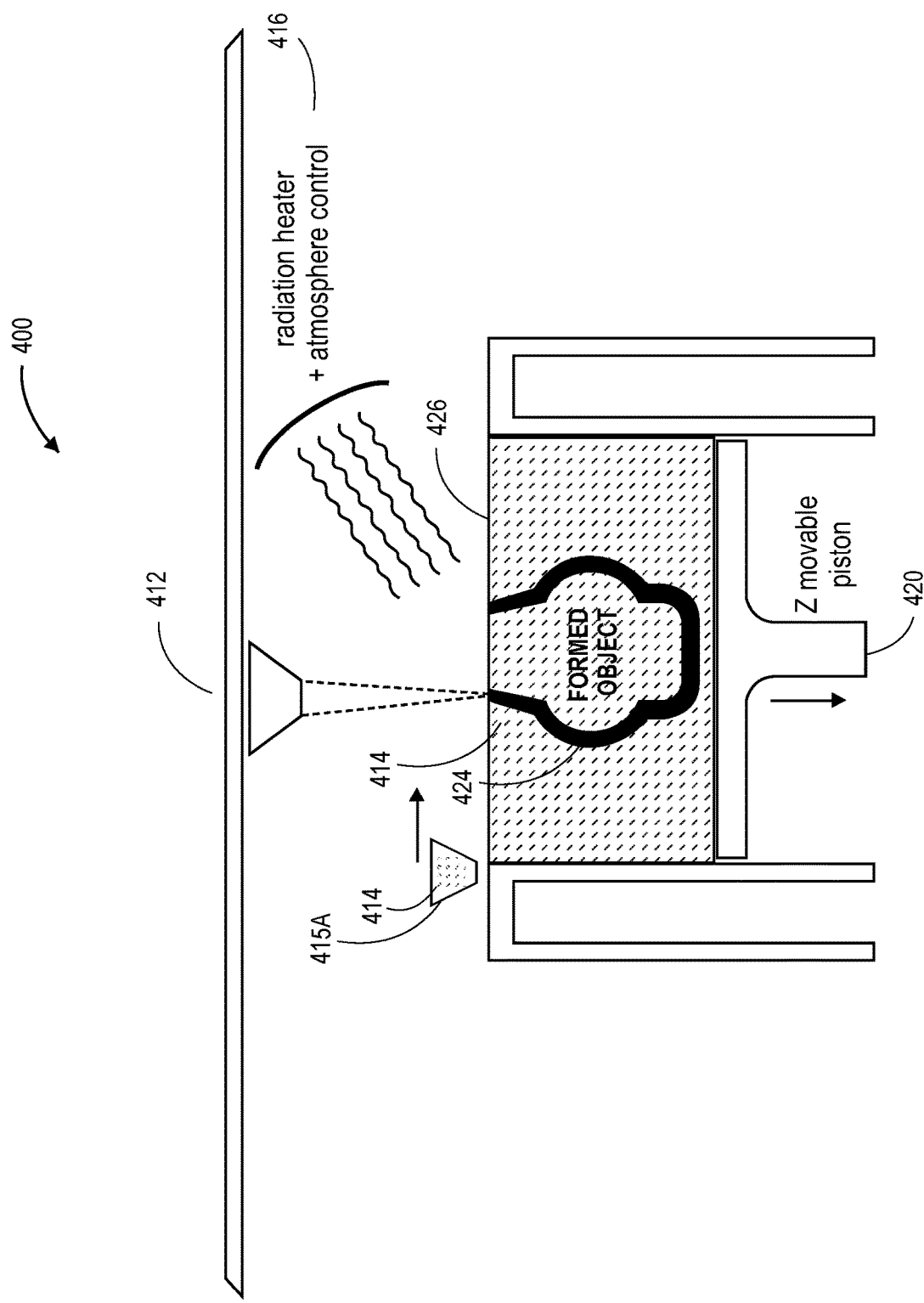

SYSTEM AND METHOD FOR MONITORING AND RECOATING IN AN ADDITIVE MANUFACTURING ENVIRONMENT This application claims the benefit of U.S. Provisional Patent Application No. 62/146,871, filed Apr. 13, 2015, the entire contents of which are hereby incorporated by reference.

BACKGROUND OF THE INVENTION

Field of the Invention

This application relates to recoating of a new layer of build material in an additive manufacturing environment. More particularly, this application relates to a system and method for monitoring recoating of layers of powder material for an object being built in an additive manufacturing environment.

Description of the Related Technology

In the field of additive manufacturing, three dimensional solid objects are formed from a digital model. Because the manufactured objects are three dimensional, additive manufacturing is commonly referred to as three dimensional ("3D") printing. Some techniques for additive manufacturing includes selective laser sintering ("LS") manufacturing and metal sintering. These techniques direct a laser beam to a specified location in order to polymerize or solidify layers of build materials which are used to create the desired three dimensional ("3D") object. The 3D object is built on a layer-by-layer basis by solidifying the layers of the build material.

For each layer of the object to be built, a new layer of building material is coated on the building platform. Accordingly, after a layer of the object is built, the platform is recoated with the building material for the next layer of the object to be built. During this recoating process, many errors can occur therefore causing the entire build process of the object to fail. For example, too much or too little building material may be applied to the platform during the recoating process. In view of these and other problems identified by the inventor, systems and methods that improve the recoating process are needed.

SUMMARY

In one embodiment, a system for monitoring recoating in an additive manufacturing environment is provided. The system comprises a computer control system comprising one or more computers having a memory and a processor. The computer control system is configured to receive data based on a thermal image of a recoating mechanism from an imaging device configured to capture thermal images. The computer control system is configured to determine a value of a property of the thermal image. The property is related to an amount of powder in the recoating mechanism. The computer control system is configured to determine at least one of: if the value indicates an error related to the amount of powder in the recoating mechanism; and an action to take with respect to the recoating mechanism that is based on the value.

In another embodiment, a method of monitoring a recoating mechanism in an additive manufacturing environment is provided. The method may comprise receiving data based on a thermal image of a recoating mechanism from an imaging device configured to capture thermal images and determining a value of a property of the thermal image, wherein the property is related to an amount of powder in the recoating mechanism. The method may further include selecting an action to take with respect to the recoating mechanism based on the determined value when the determined value indicates an error related to the amount of powder in the recoating mechanism.

BRIEF DESCRIPTION OF THE DRAWINGS

FIG. 4A is an example of an additive manufacturing apparatus with a recoating mechanism which may be monitored according to the systems and methods disclosed herein.

DETAILED DESCRIPTION OF CERTAIN INVENTIVE EMBODIMENTS

Systems and methods disclosed herein include monitoring and controlling recoating mechanisms in powder based additive manufacturing machines. Though some embodiments described herein are described with respect to selective laser sintering techniques using powder as a building material, the described system and methods may also be used with certain other additive manufacturing techniques and/or certain other building materials as would be understood by one of skill in the art.

One problem with the recoating process for powder based (e.g., polymer, metal, etc.) additive manufacturing techniques and devices, is that if the incorrect amount of material is used to recoat the build area, the building of an object may fail. For example, if a recoating mechanism (e.g., recoater, blade recoater, roller, etc.), does not have enough material to completely cover a new layer of the build area with powder, the object may be incorrectly formed, or the entire build of the object may fail. The inventors of the current application have found that this issue may arise for a variety of different reasons including the following: 1) an inadequate amount of powder is fed into the recoating mechanism; 2) one or more feeders (configured to feed powder to the recoating mechanism) is not feeding the powder correctly (e.g., due to partial or complete blockage, bridging in the feeding bin that contains the powder fed to the recoating mechanism, etc.);

and/or 3) a lack of powder in the feeding bin(s) that feed powder to the recoating mechanism.

Embodiments of the systems and methods described herein may allow the amount of powder within the recoating mechanism itself to be monitored. Further, embodiments of the systems and methods described herein may allow the temperature of powder within the recoating mechanism itself to be monitored. Information regarding the amount of powder and temperature of the powder within the recoating mechanism may be used by the systems and methods to detect errors in the recoating process, such as those described herein, that can lead to an improper amount of powder being recoated on the build area. Further, the systems and methods may control certain actions that correct the detected errors. In some embodiments, the systems and methods may utilize an imaging device, such as a camera or a thermal imaging device (e.g., thermal camera, infrared camera, etc.) configured to monitor the recoating mechanism. Though some embodiments described herein are described with respect to a recoating mechanism such as a recoater that contains powder that is monitored in the recoating mechanism itself, the described systems and methods may be used with other recoating mechanisms, such as a roller, where the powder just in front (e.g., the direction in which the roller moves to push powder evenly over the build area) of the roller is monitored.

Figure 1:
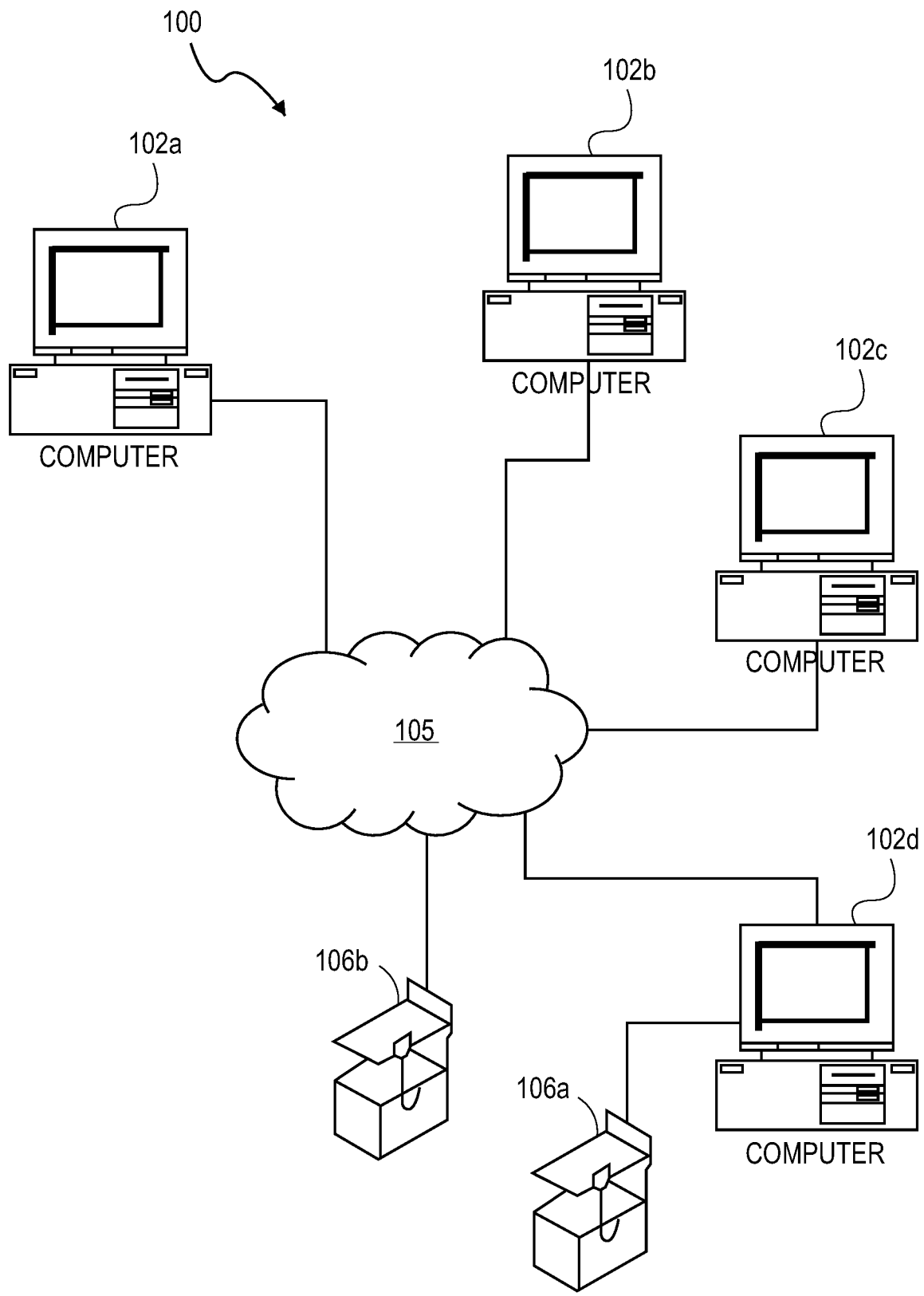
FIG. 1 is an example of a system for designing and manufacturing 3D objects.

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some aspects, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
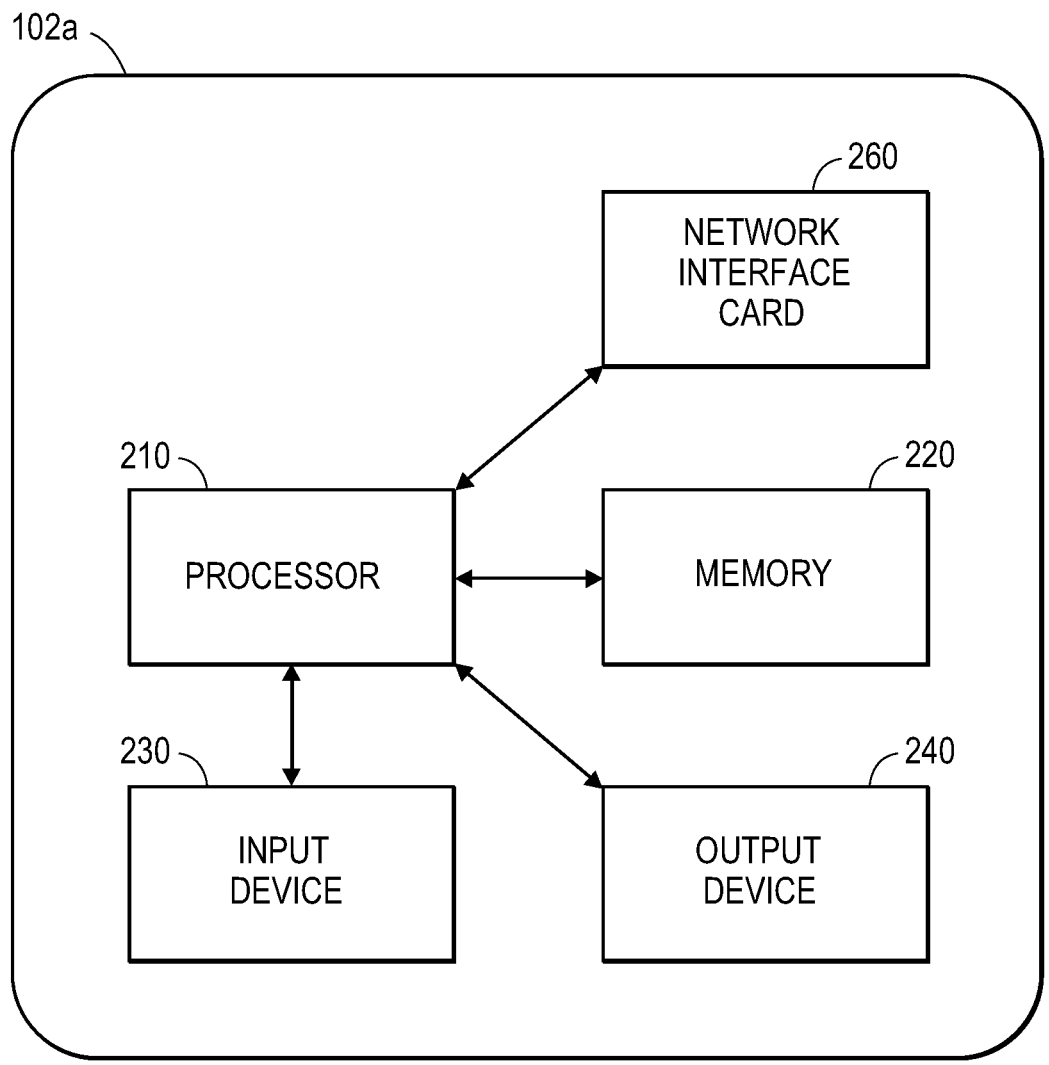
FIG. 2 illustrates a functional block diagram of one example of the computer shown in FIG. 1.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
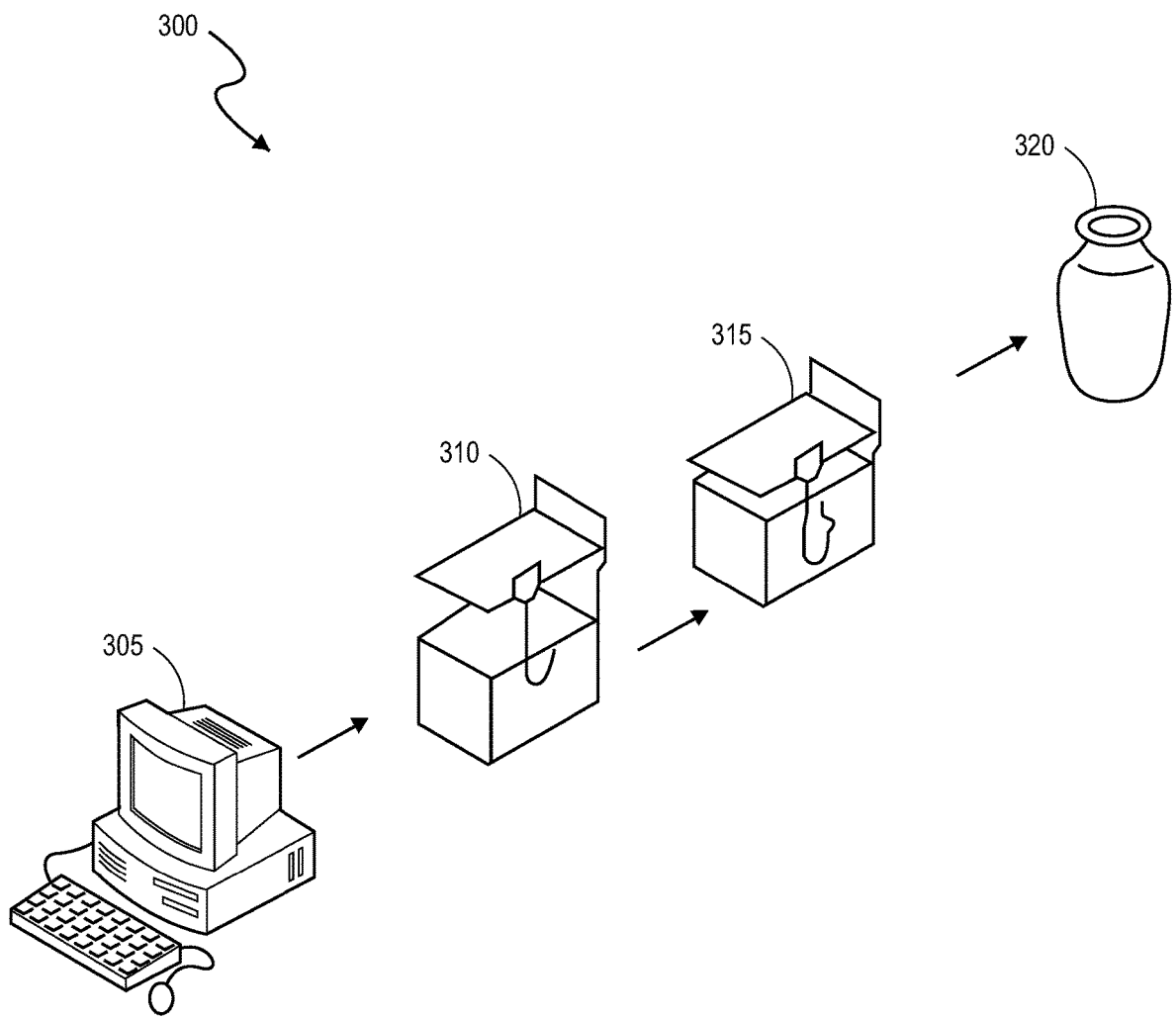
FIG. 3 shows a high level process for manufacturing a 3D object using.

FIG. 3 illustrates a process 300 for manufacturing a 3-D object or device. As shown, at a step 305, a digital representation of the object is designed using a computer, such as the computer 102a. For example, 2-D or 3-D data may be input to the computer 102a for aiding in designing the digital representation of the 3-D object. Continuing at a step 310, information is sent from the computer 102a to an additive manufacturing device, such as additive manufacturing device 106, and the device 106 commences the manufacturing process in accordance with the received information.

At a step 315, the additive manufacturing device 106 continues manufacturing the 3-D object using suitable materials, such as a polymer or metal powder. Further, at a step 320, the 3-D object is generated.

FIG. 4A illustrates an exemplary additive manufacturing apparatus 400 for generating a three-dimensional (3-D) object. In this example, the additive manufacturing apparatus 400 is a laser sintering device. The laser sintering device 400 may be used to generate one or more 3D objects layer by layer. The laser sintering device 400, for example, may utilize a powder (e.g., metal, polymer, etc.), such as the powder 414, to build an object a layer at a time as part of a build process.

Successive powder layers are spread on top of each other using, for example, a recoating mechanism 415A (e.g., a recoater blade). The recoating mechanism 415A deposits powder for a layer as it moves across the build area, for example in the direction shown, or in the opposite direction if the recoating mechanism 415A is starting from the other side of the build area, such as for another layer of the build. After deposition, a computer-controlled $CO_2$ laser beam scans the surface and selectively binds together the powder particles of the corresponding cross section of the product. In some embodiments, the laser scanning device 412 is an X-Y moveable infrared laser source. As such, the laser source can be moved along an X axis and along a Y axis in order to direct its beam to a specific location of the top most layer of powder. Alternatively, in some embodiments, the laser scanning device 412 may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 400 may also optionally include a radiation heater (e.g., an infrared lamp) and/or atmosphere control device 416. The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

Figure 4B:
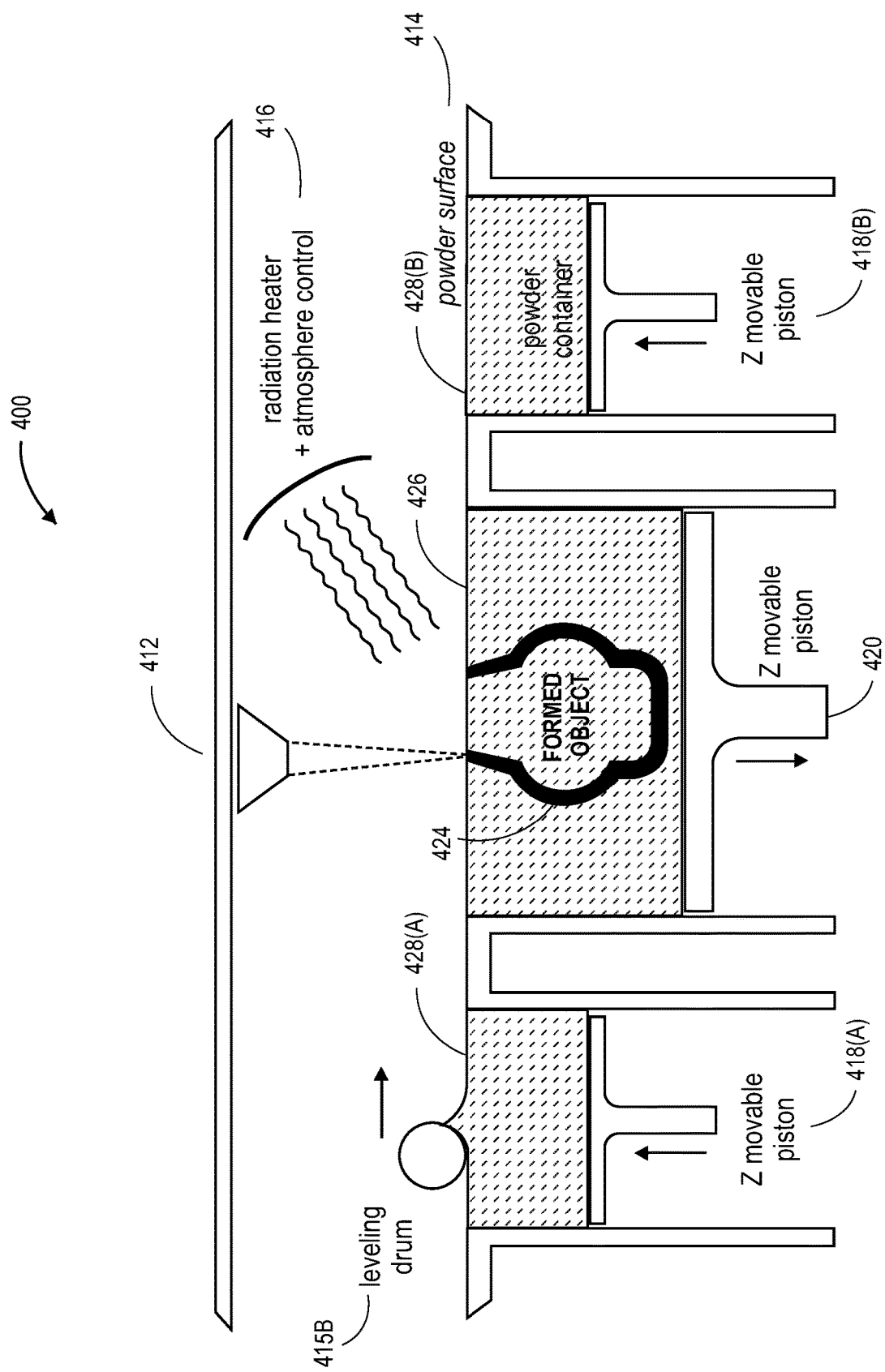
FIG. 4B is another example of an additive manufacturing apparatus with a recoating mechanism which may be monitored according to the systems and methods disclosed herein.

In some other embodiments, such as shown with respect to FIG. 4B, a recoating mechanism 415B (e.g., a leveling drum/roller) may be used instead of the recoating mechanism 415A. Accordingly, the powder may be distributed using one or more moveable pistons 418(a) and 418(b) which push powder from a powder container 428(a) and 428(b) into a reservoir 426 which holds the formed object 424. The depth of the reservoir, in turn, is also controlled by a moveable piston 420, which increases the depth of the reservoir 426 via downward movement as additional powder is moved from the powder containers 428(a) and 428(b) in to the reservoir 426. The recoating mechanism 415, pushes or rolls the powder from the powder container 428(a) and 428(b) into the reservoir 426.

Figure 4C:
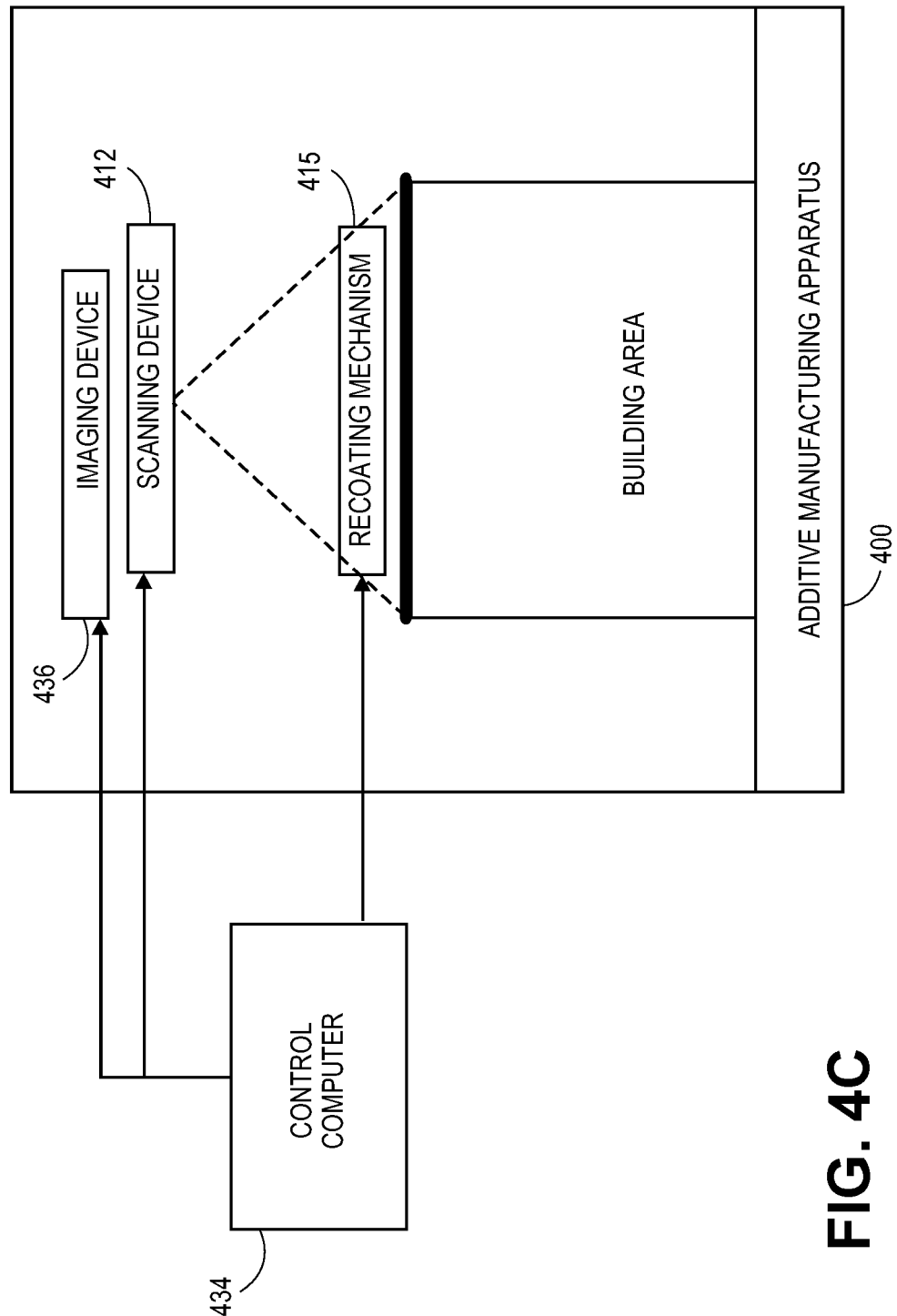
FIG. 4C is an example of components of an additive manufacturing apparatus 400 of FIGS. 4A and/or 4B which may be used according to the systems and methods disclosed herein.
Figure 5A:
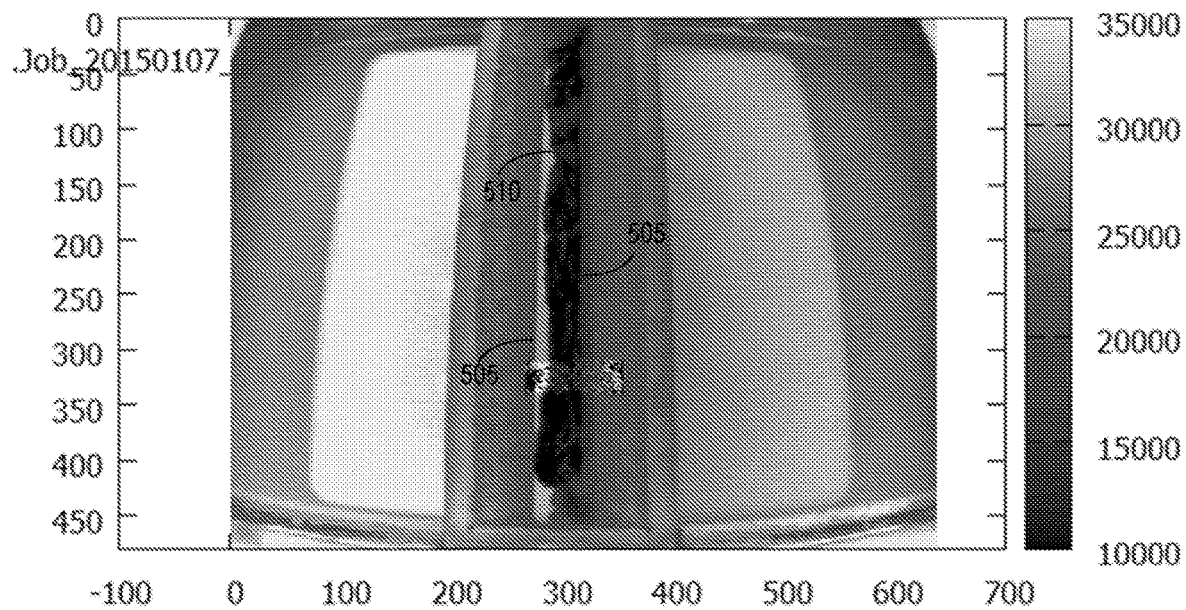
FIGS. 5A-5I are examples of thermal images of a recoating mechanism of FIG. 4A.
Figure 5B:
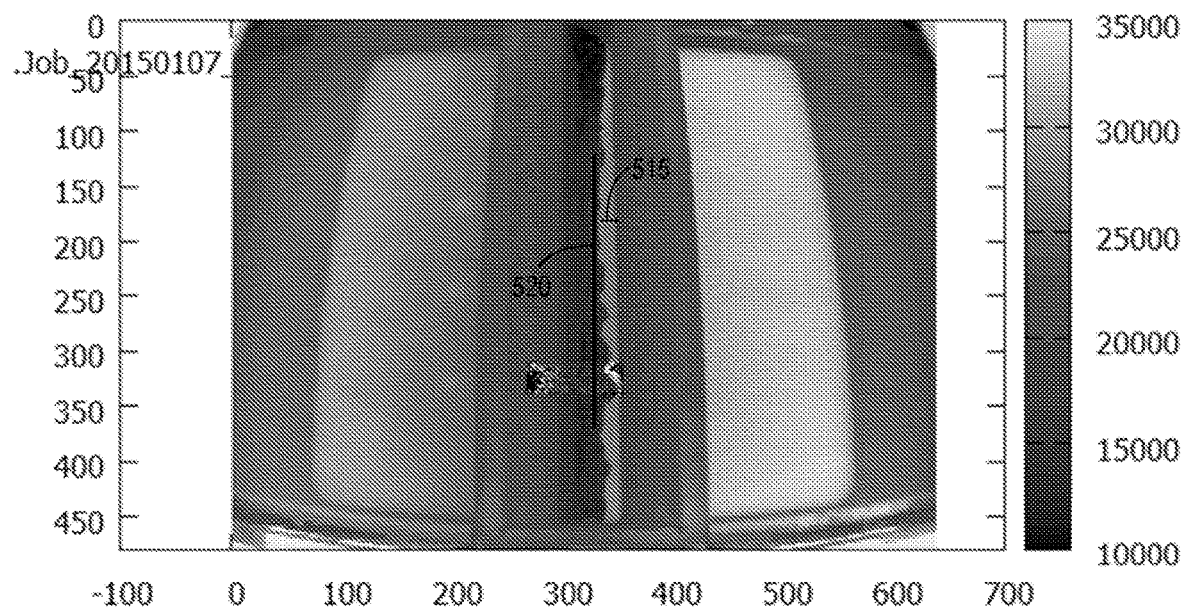
Figure 5C:
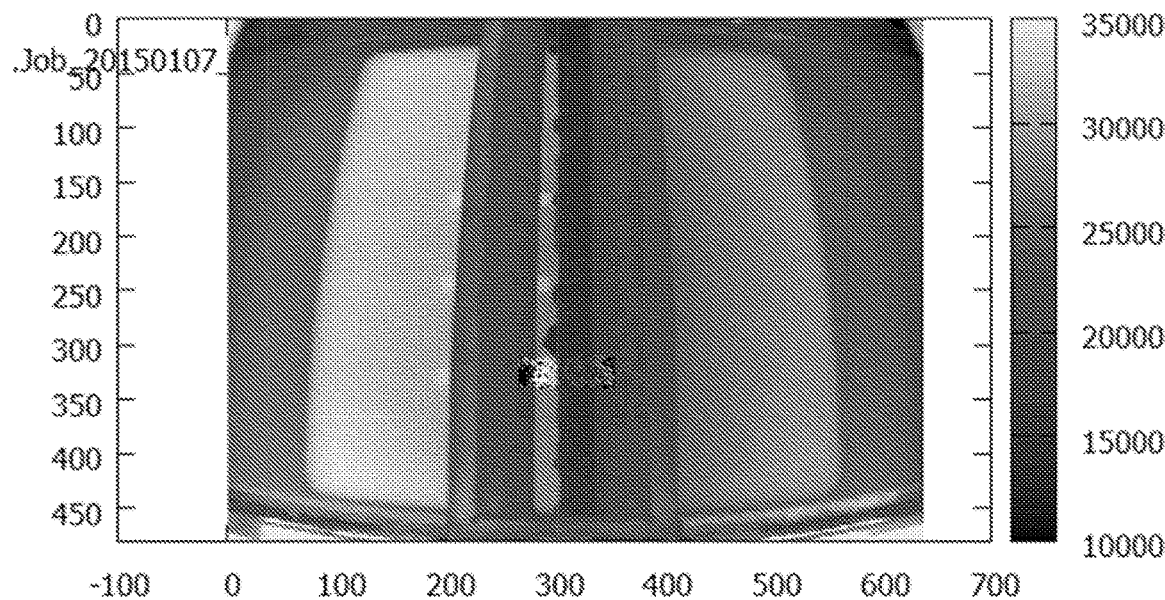
Figure 5D:
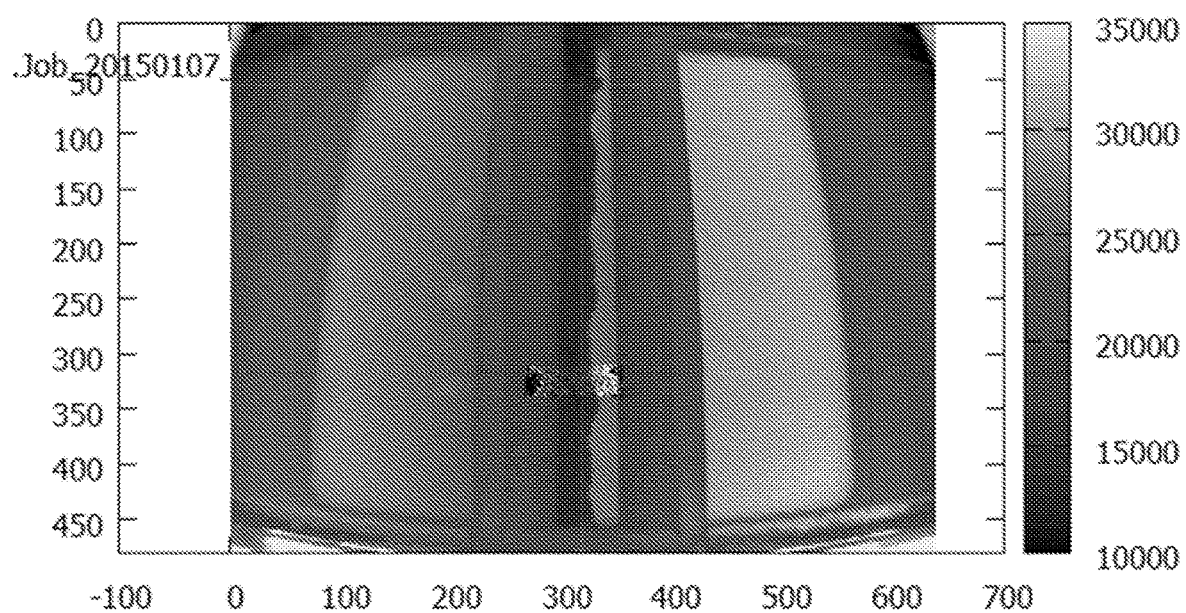
Figure 5E:
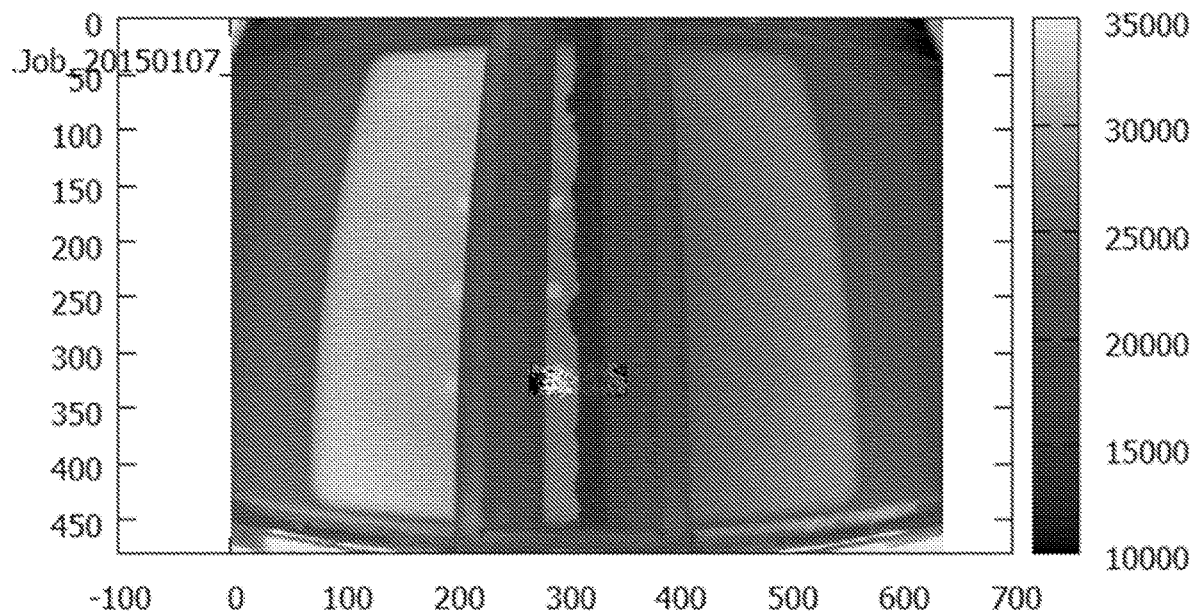
Figure 5F:
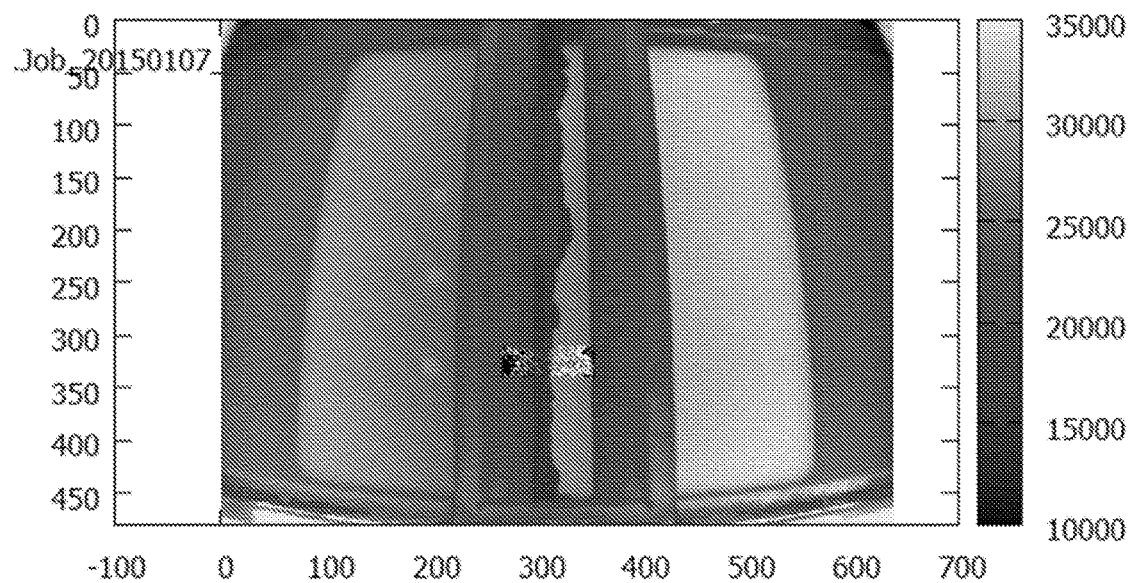
Figure 5G:
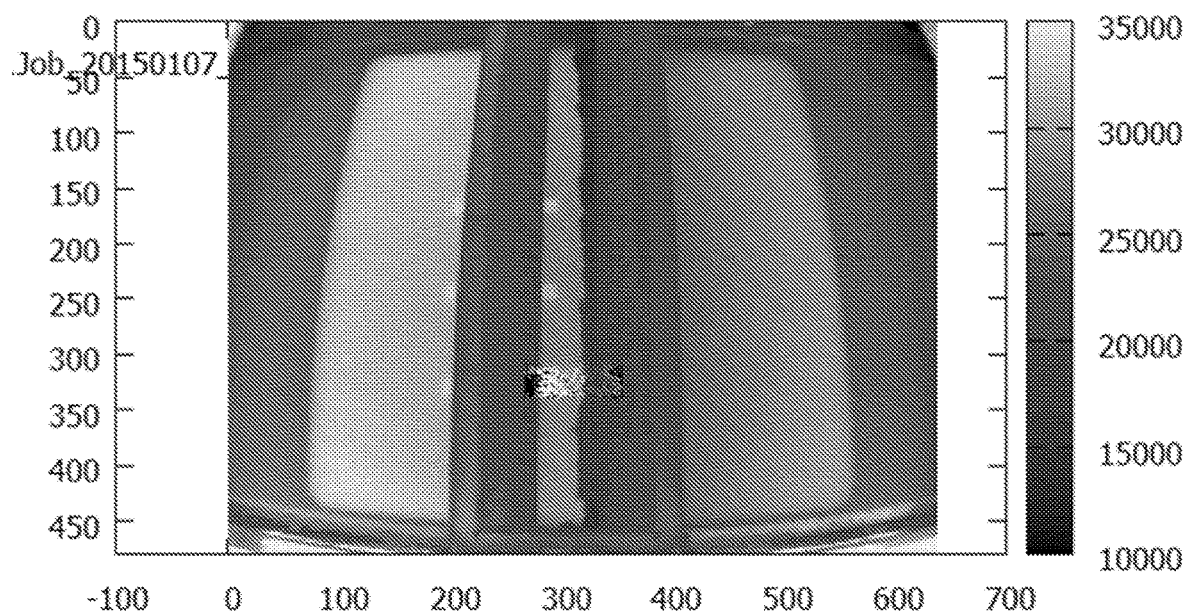
Figure 5H:
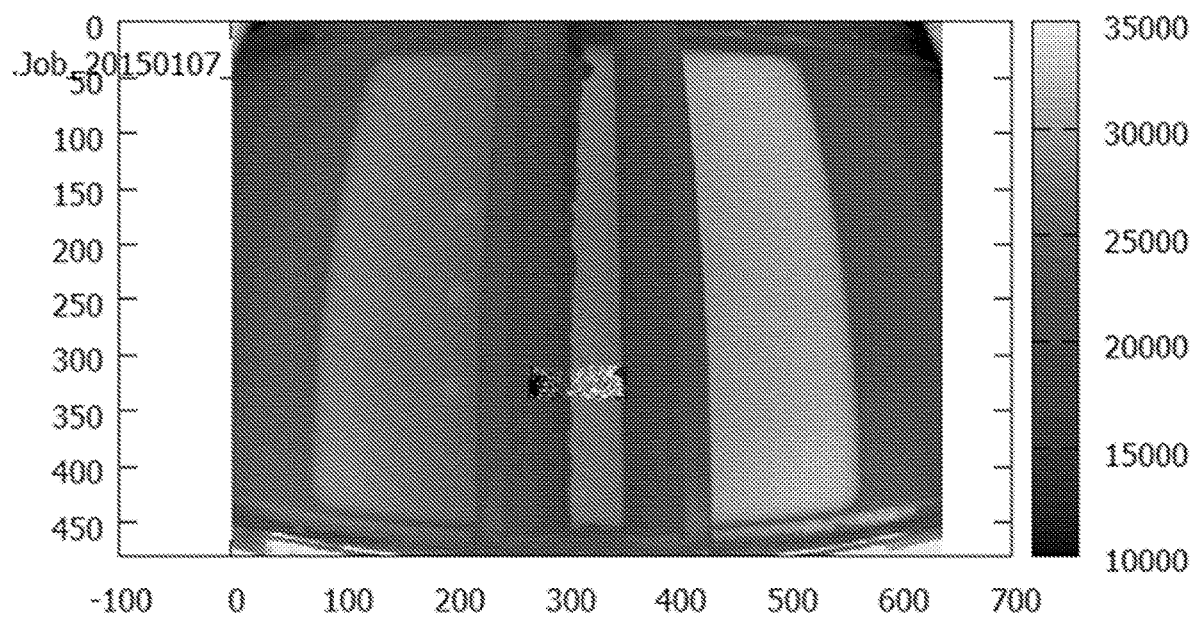
Figure 5I:
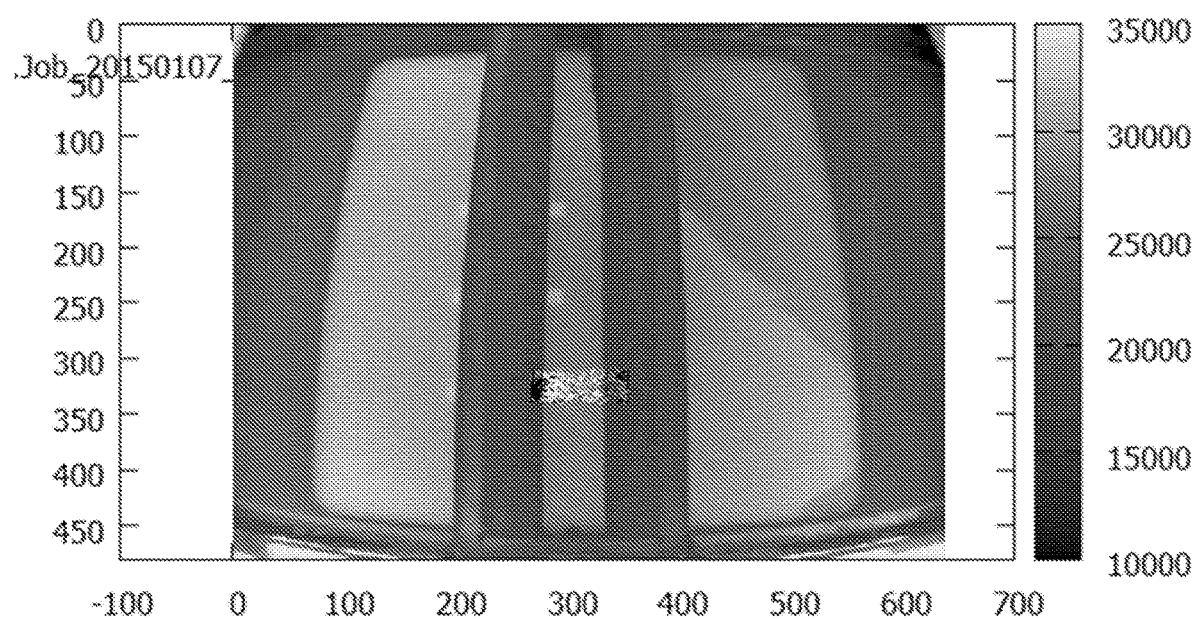

As discussed above, the amount of powder and/or temperature of the powder in the recoating mechanism 415 (e.g., within the recoating mechanism 415A or in front of the recoating mechanism 415B) may be monitored, for example, using a control computer 434 and an imaging device 436 as shown in FIG. 4C. The imaging device 436 may be configured to attach to, be integrated with, and/or sit separate from the additive manufacturing apparatus 400 and placed in such a position to monitor the recoating mechanism 415. Further, the imaging device 436 may be configured to be stationary, or moveable (such as based on control signals received from the control computer 434) to monitor the recoating mechanism 415 in different positions. For example, the recoating mechanism may be configured to move with the recoating mechanism 415. The control computer 434 may be configured to control operations of the additive manufacturing apparatus 400. In some embodiments, the control computer 434 may be the computer 102(a) from FIG. 2 or the computer 305 from FIG. 3. In some embodiments, the control computer 434 may be a controller built into or configured to interface with the additive manufacturing apparatus 400. The control computer 434 may further be configured to interface with the imaging device 436, such as to receive data/images from the imaging device 436. The control computer 434 may further be configured to process the data/images to determine if errors have or will occur in the build process as described herein. The control computer 434 may further be configured to control when and how the imaging device 436 captures images.

For example, the amount of powder and/or temperature of the powder may be monitored by the imaging device 436 and control computer 434 to determine if the recoating mechanism 415 has enough powder for the building of the object. The imaging device 436 may take and send thermal images, images, or other data indicative of such images to the control computer 434. The control computer 434 may be configured to utilize this data to determine if any errors have or may occur with the build process. For example, the control computer 434 may calculate one or more values (e.g., distance between edges, rate of change of temperature, rate of change of distance between edges, temperature of one or more pixels, slope of temperature gradient over multiple pixels) of one or more properties (e.g., edges of objects, thermal temperature readings, thermal gradients) of the captured images. The control computer 434, in some embodiments, may compare the one or more values of the one or more properties to one or more thresholds to determine if an error has occurred, such as the powder level in the recoating mechanism 415 is decreasing (e.g., below a certain threshold level, or decreasing above a certain threshold rate) or a sudden change in powder temperature. The control computer 434 may further determine in what type of scenario the error is occurring. The control computer 434 may then direct certain operations (e.g., the control computer 434 may direct additional powder to be fed into the appropriate feeder, or may direct an audible and/or visual warning to alert a user to the issue, so the user can take appropriate action, e.g., clear the blockage, add powder adjust powder amounts, etc.) of the additive manufacturing apparatus 400 to correct such errors. Additionally or alternatively, the control computer 434, in some embodiments, may utilize the one or more values of the one or more properties to direct certain operations (e.g., the control computer 434 may direct additional powder to be fed into the appropriate feeder, or may direct an audible and/or visual warning to alert a user to the issue, so the user can take appropriate action, e.g., clear the blockage, add powder adjust powder amounts, etc.). In some embodiments, the control computer 434 may direct the operations in proportion to or based on a formula involving the one or more values of the one or more properties. For example, additional powder may be fed based on (e.g., in proportion to) the one or more values.

For example, the control computer 434 may determine if the amount of powder in the recoating mechanism 415 is decreasing in a type of scenario when large surfaces are scanned for building. If the amount of powder is decreasing in this type of scenario, the control computer 434 may be determine that not enough powder is being fed into the recoating mechanism 415. Accordingly, the control computer 434 may direct additional powder to be fed into the recoating mechanism 415, or may direct an audible and/or visual warning to alert a user to the issue, so the user can take appropriate action, e.g., adjust powder amounts or add powder.

In another example, the control computer 434 may determine if the amount of powder in the recoating mechanism 415 is decreasing in a type of scenario only when the recoating mechanism 415 is moving in one direction, but not in the opposite direction. If the amount of powder is decreasing in this type of scenario, the control computer 434 may be determine that one of the feeders (e.g., on one side of the build area and not the other) may be blocked or empty. Accordingly, the control computer 434 may direct additional powder to be fed into the appropriate feeder, or may direct an audible and/or visual warning to alert a user to the issue, so the user can take appropriate action, e.g., clear the blockage or add powder.

It should be noted that the reduction in the amount of powder in the recoating mechanism 415, or changes in temperature of the powder (which may indicate a reduction in the amount of powder in the recoating mechanism 415), in different scenarios may not occur over the entire area of the recoating mechanism 415 (i.e., the direction along the recoating mechanism 415 that is perpendicular to the direction of movement of the recoating mechanism 415). Rather, the reduction in the amount of powder, or change in temperature of the powder, may only occur in some locations along the area of the recoating mechanism 415, which may still lead to build errors and therefore require correction.

In some embodiments, different processes or techniques may be used to determine the amount of powder in the recoating mechanism 415, or changes in temperature of the powder. In some embodiments, the data sent from the imaging device 436 to the control computer 434 includes thermal images of the recoating mechanism 415 and the powder in the recoating mechanism 415. FIGS. 5A-5I are examples of such thermal images. These thermal images may be used to determine the amount of powder in the recoating mechanism 415, or changes in temperature of the powder.

In some embodiments, the amount of powder in the recoating mechanism 415 may be monitored based on calculations involving the distance between an edge of the recoating mechanism 415 and an edge of the powder in the recoating mechanism 415. In some embodiments, the control computer 434 may be configured to either have preprogrammed where the edges 505 of the recoating mechanism 415 are located in the thermal image (such as if images of the recoating mechanism 415 are taken with the recoating mechanism 415 in a known position), or detect the edges 505 of the recoating mechanism 415 in the thermal image, such as using image edge detecting techniques (e.g., Canny edge detection, differential edge detection, phase congruency-based edge detection, etc.). The edges 505 would typically be straight lines.

The control computer 434 may further be configured to determine the front of the powder 510 in the recoating mechanism 415. The front of the powder 510 may be the line (typically not a straight line) of the edge of the powder in the recoating mechanism 415 that is at the front of or closest to the direction the recoating mechanism 415 is moving, and may not be directly abutting either of the edges 505. The front of the powder 510 may be determined using image edge detecting techniques.

The control computer 434 may be configured to determine the distance 515 between the front of the powder 510 and the edge 505 of the recoating mechanism. The control computer 434 may calculate this distance 515 based on the distance between the front of the powder 510 and the edge 505 at a particular point (e.g., center of the recoating mechanism 415 along the axis perpendicular to the movement of the recoating mechanism 415, another point, etc.) or at multiple points (e.g., average, weighted average, greatest distance, some other formula of the distances at the multiple points, etc.). In some embodiments, the control computer 434 may be configured to compare the calculated distance to a threshold, where if the calculated distance is above a threshold, the amount of powder in the recoating mechanism 415 is determined to be too little and corrective action is required. Additionally or alternatively, the control computer 434 may be configured to direct operations (e.g., adding an amount of powder) based on (e.g., in proportion to) the calculated distance. For example, the greater the calculated distance, the more powder that is added, and the less the calculated distance, the less powder that is added. The control computer 434 may calculate this distance between the front of the powder 510 and the edge 505 over time (e.g., once for each layer of powder recoating; every other layer; every N layers, where N is a positive integer; at specific time intervals, etc.).

Further, additionally or alternatively, the control computer 434 may determine that if the change in distance between the front of the powder 510 and the edge 505 is changing at a rate (e.g., over a certain number of intervals and/or time) that is above a threshold, the amount of powder in the recoating mechanism 415 is determined to be reducing at too high a rate and corrective action is required. Additionally or alternatively, the control computer 434 may be configured to direct operations (e.g., adding an amount of powder) based on (e.g., in proportion to) the rate. For example, the greater the rate, the more powder that is added, and the less the rate, the less powder that is added.

For example, FIGS. 5A-5I are successive thermal images of a recoating mechanism 415 for layers 14-22, respectively, of a build process of an object. As seen, the distance between the edge 505 and front of the powder 510 is decreasing between images, meaning that there is an error that requires corrective action.

In some embodiments, the amount of powder in the recoating mechanism 415 may be monitored based on calculations involving the temperature of the powder in the recoating mechanism 415. For example, the control computer 434 may determine if a large temperature change occurs in a short span of time (e.g., the change in temperature over time is above a threshold level) and/or if the temperature of the powder is above a threshold level. For example, a large change in the powder temperature or the temperature being above a threshold may indicate that there is not enough powder being fed into the recoating mechanism 415 and the powder level is decreasing. This may be because the powder already in the recoating mechanism 415 is heated during the build process, without additional cooler powder being added to the recoating mechanism 415, which would lower the overall temperature of the powder. Additionally or alternatively, the control computer 434 may be configured to direct operations (e.g., adding an amount of powder) based on (e.g., in proportion to) the temperature and/or temperature change. For example, the greater the temperature and/or temperature change, the more powder that is added, and the less the temperature and/or temperature change, the less powder that is added.

For example, the control computer 434 may be configured to analyze a temperature or thermal gradient of one or more pixels in the thermal images. In some embodiments, the control computer 434 may be configured to analyze a thermal gradient of pixels along a line 520 perpendicular to the movement of the recoating mechanism 415 (e.g., a perpendicular line at the center of the recoating mechanism 415 along the axis parallel to the movement of the recoating mechanism 415, a line at another point, etc.), temperature at a particular pixel in the image (e.g., center of the recoating mechanism 415, another point, etc.) or temperature at multiple pixels (e.g., average, weighted average, greatest temperature, some other formula of the temperatures at the multiple pixels, etc.). The control computer 434 may be configured to compare the calculated temperature to a threshold (e.g., absolute threshold, threshold in relation to temperature of powder preheated in bins, etc.), where if the calculated temperature is above a threshold, the amount of powder in the recoating mechanism 415 is determined to be too little and corrective action is required. Additionally or alternatively, the control computer 434 may be configured to direct operations (e.g., adding an amount of powder) based on (e.g., in proportion to) the temperature. For example, the greater the temperature, the more powder that is added, and the less the temperature, the less powder that is added. The control computer 434 may calculate this temperature over time (e.g., once for each layer of powder recoating; every other layer; every N layers, where N is a positive integer; at specific time intervals, etc.).

Further, additionally or alternatively, the control computer 434 may determine that if the change in temperature is at a rate (e.g., over a certain number of intervals and/or time) is above a threshold, the amount of powder in the recoating mechanism 415 is determined to be reducing at too high a rate and corrective action is required. Additionally or alternatively, the control computer 434 may be configured to direct operations (e.g., adding an amount of powder) based on (e.g., in proportion to) the temperature change. For example, the greater the temperature change, the more powder that is added, and the less the temperature change, the less powder that is added.

Additionally or alternatively, in embodiments where the control computer 434 is configured to analyze a thermal gradient of pixels along a line 520 perpendicular to the movement of the recoating mechanism 415, the control computer 434 may determine if the temperature gradient over that line has a slope (e.g., slope of a best fit line, slope at certain points along the line, etc.) greater than a threshold and/or a slope changing at a rate (e.g., increasing over a number of layers, over a certain time period, etc.) greater than a threshold, indicating that the amount of powder in the recoating mechanism 415 is determined to be too little and corrective action is required. Additionally or alternatively, the control computer 434 may be configured to direct operations (e.g., adding an amount of powder) based on (e.g., in proportion to) the slope and/or rate. For example, the greater the slope and/or rate, the more powder that is added, and the less the slope and/or rate, the less powder that is added.

Figure 6A:
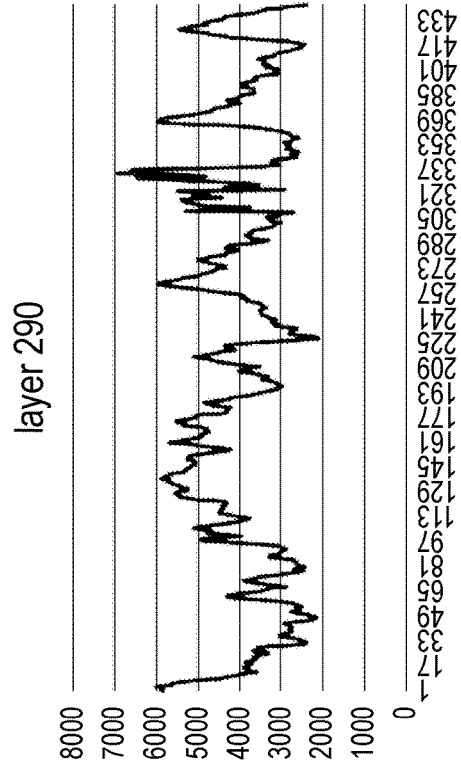
FIGS. 6A-6M are examples of plots of a temperature gradient along a line in a thermal image of a recoating mechanism of FIG. 4A.
Figure 6B:
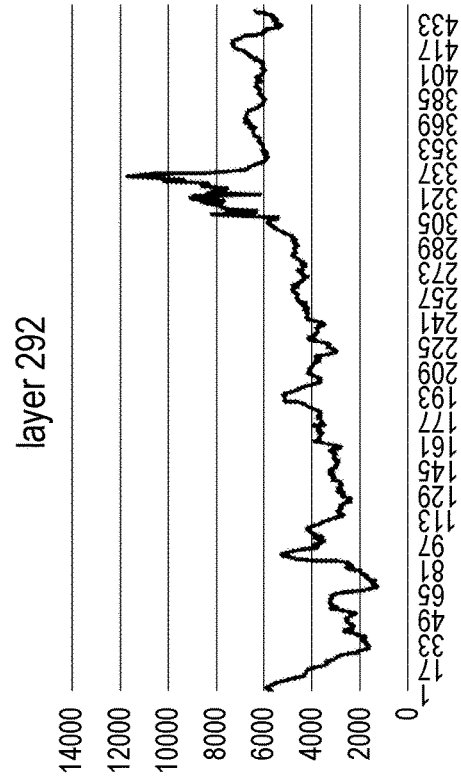
Figure 6C:
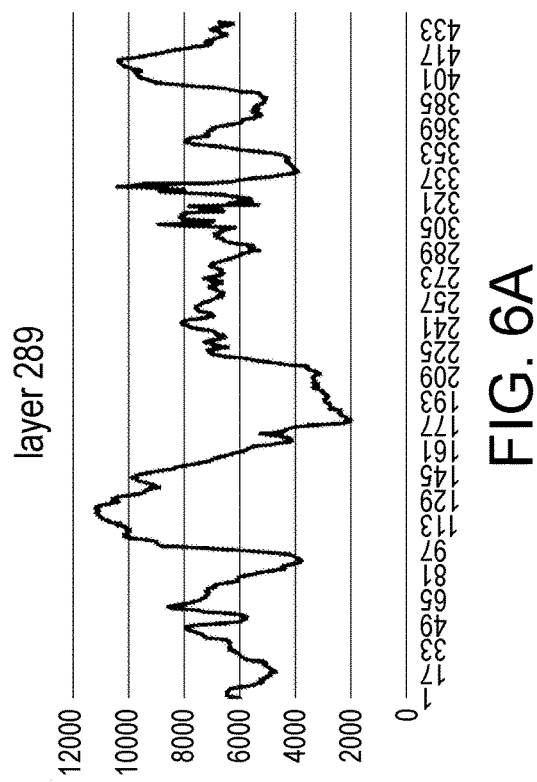
Figure 6D:
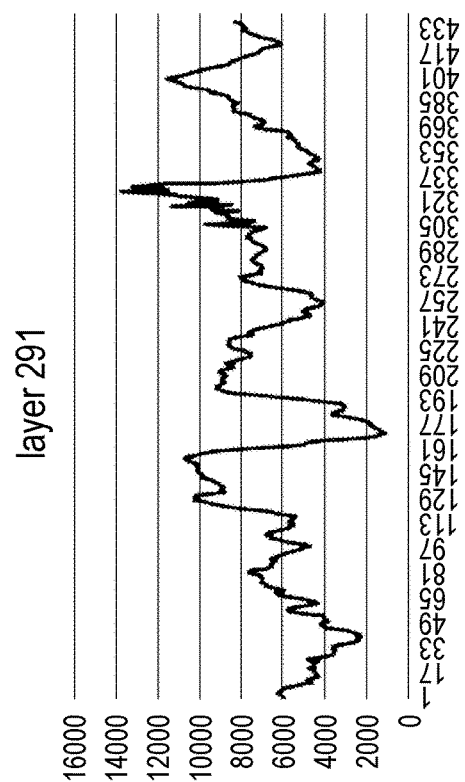
Figures 6E, 6F, 6G, 6H:
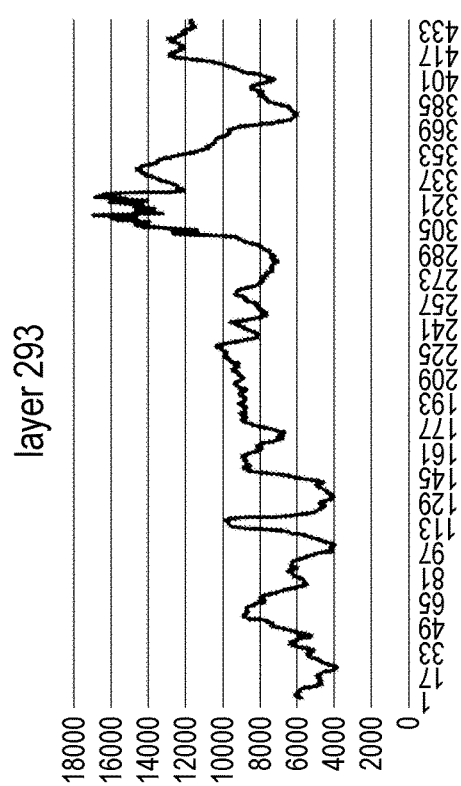
Figure 6J:
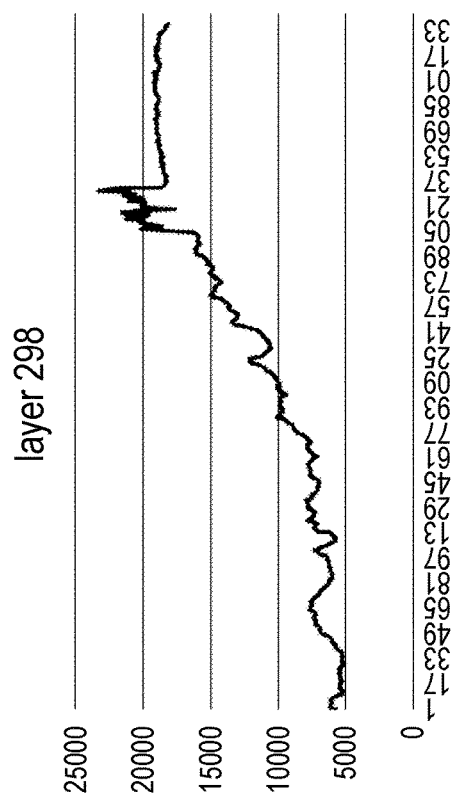
Figure 6L:
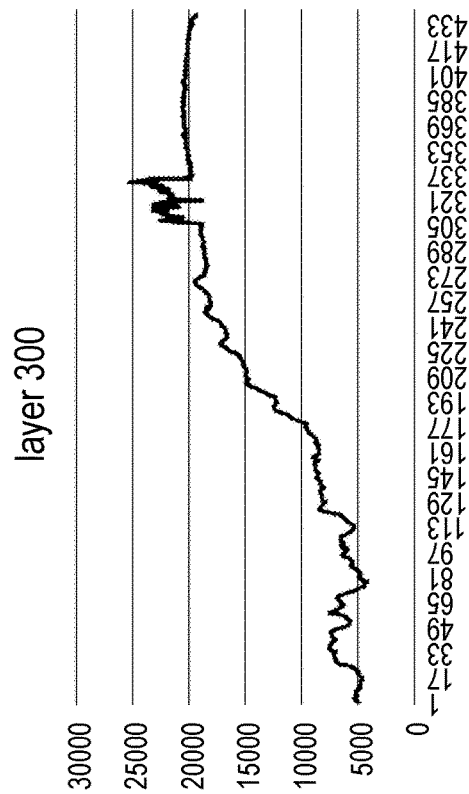
Figure 6I:
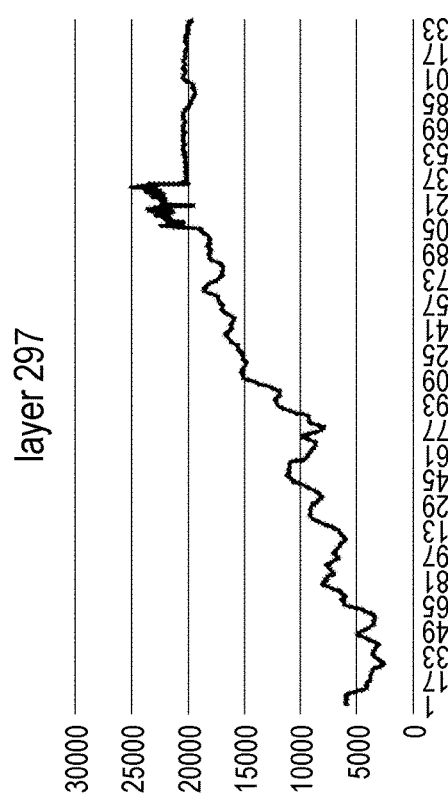
Figure 6K:
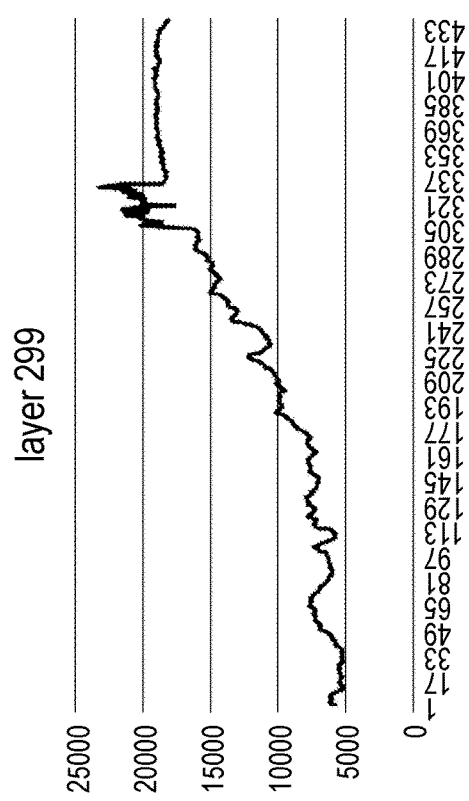
Figure 6M:
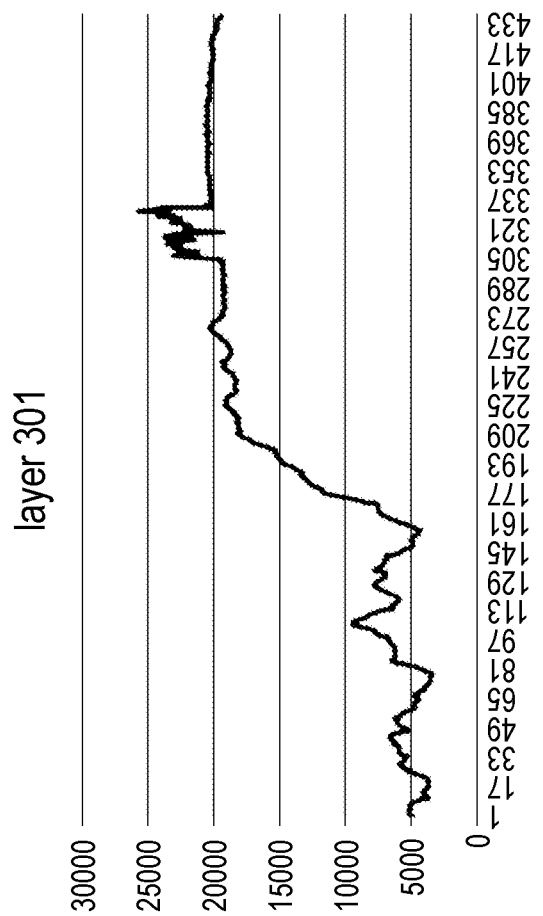

For example, each of FIGS. 6A-6M shows a plot of the temperature gradient along a line 520 in a thermal image of the recoating mechanism 515. The x-axis of the plot is indicative of the points along the line 520, and the y-axis of the plot is indicative of the temperature. As shown in FIG. 6A, there is no overall slope developing in the line 610 representing the temperature gradient. Each of the successive FIGS. 6B, C, D, etc., show the temperature gradient along the line 520 for successive layers of the build of an object. As shown, a slope begins developing in the line 610, indicating an issue with low powder levels in the recoating mechanism 415, and meaning that there is an error that requires corrective action.

Figure 7:
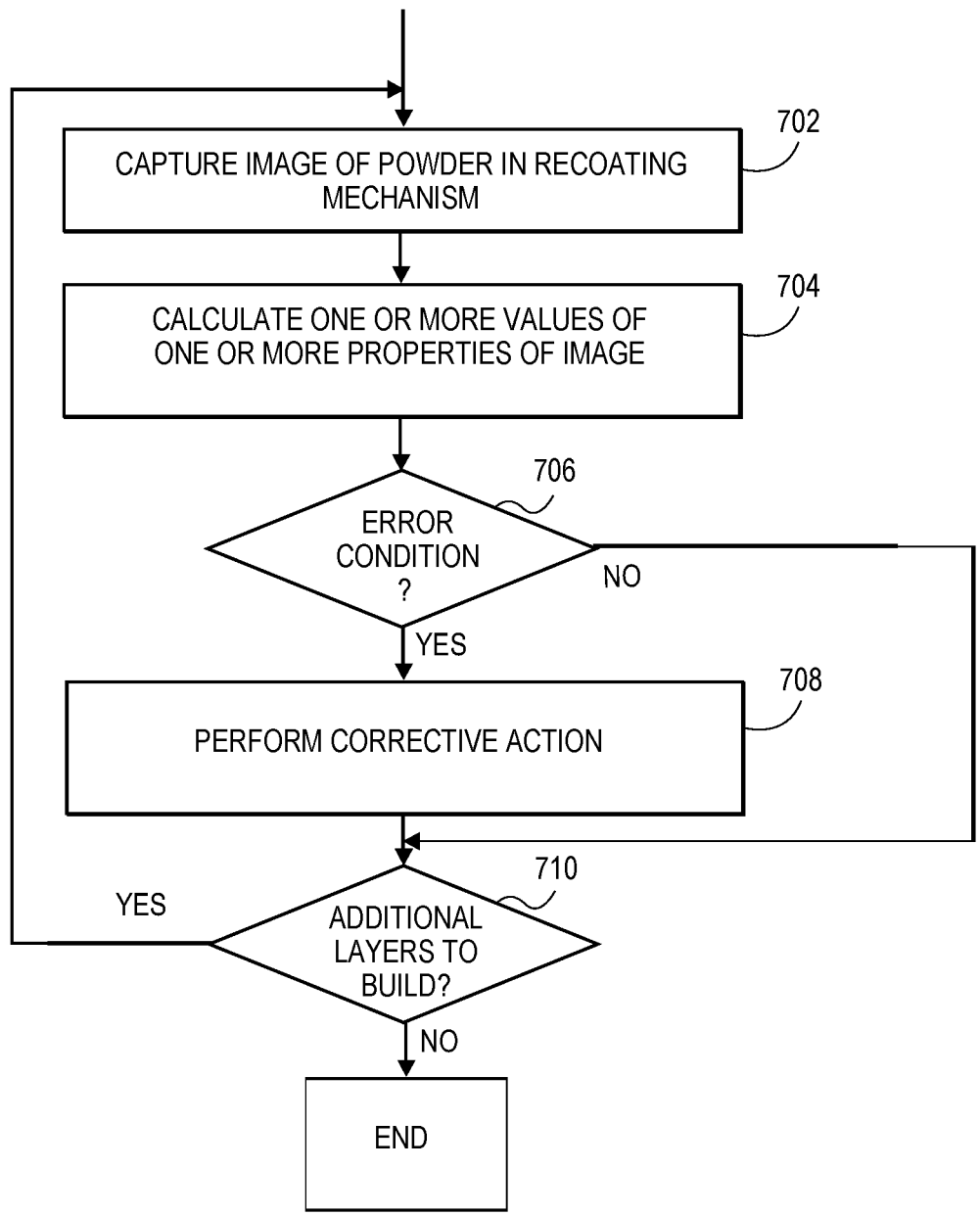
FIG. 7 is a flowchart that illustrates a process by which a control computer in conjunction with an imaging device monitors the powder in a recoating mechanism.

FIG. 7 illustrates a process by which the control computer 434 in conjunction with the imaging device 436 may monitor the powder in the recoating mechanism 415 during the build of an object using the additive manufacturing apparatus 400. The process 700 begins at a block 702, where the imaging device 436 (e.g., controlled by the control computer 434) captures an image (e.g., thermal image) of the powder in the recoating mechanism 415 at a time associated with the building of a given layer of the object. Continuing, at a block 704, one or more values of one or more properties based on the image (and optionally on one or more previously captured images for previous layers of the build process, such as for a rate calculation) are calculated. Further, at an optional block 706, in embodiments where a threshold comparison is performed, the one or more values of one or more properties are each compared to a respective threshold value. In embodiments where a threshold comparison is not performed, the process continues to the block 708 directly from block 704. If at the block 706, it is determined that the comparison indicates an error has occurred (e.g., any the one or more values of one or more properties are above/below (depending on how the calculation is performed) its respective threshold value), the process continues to a block 708. Otherwise, the process 700 continues to a block 710, where it is determined if there are any additional layers to be built for the object. If there are additional layers to be built, the process returns to the block 702, otherwise the process ends.

At the block 708, in embodiments where a threshold comparison is performed, the control computer 434 determines and performs a corrective action (e.g., the control computer 434 may direct additional powder to be fed into the appropriate feeder, or may direct an audible and/or visual warning to alert a user to the issue, so the user can take appropriate action, e.g., clear the blockage, add powder adjust powder amounts, etc.) based on the error determined in block 706. Optionally, at the block 708, the control computer 434 may in addition determine the corrective action based on a type of scenario the error occurred in, as may be determined by the control computer 434. In embodiments where a threshold comparison is not performed, at the block 708, the control computer may direct operations (e.g., take corrective action such as adding an amount of powder) based on (e.g., in proportion to) the one or more values. Continuing, the process 700 may proceed to the block 710.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method of monitoring a recoating mechanism in an additive manufacturing environment using powder as building material, the method comprising:
   receiving data based on a thermal image of a recoating mechanism from an imaging device configured to capture thermal images;
   determining a value of a property of the thermal image;
   determining a temperature characteristic of the powder, based on the value, for determining an amount of powder in the recoating mechanism; and
   selecting an action to take with respect to the recoating mechanism based on the determined value when the determined value indicates an error related to the determined amount of powder in the recoating mechanism.

2. The method of claim 1, further comprising capturing a thermal image of the recoating mechanism using a thermal imaging device, wherein the thermal imaging device comprises an infrared camera.

3. The method of claim 1, wherein the property of the thermal image comprises at least one of: a thermal temperature of one or more pixels of the thermal image; or a thermal gradient of the one or more pixels of the thermal image.

4. The method of claim 1, wherein the determined value comprises at least one of: a temperature of one or more pixels; a rate of change of temperature; or a slope of a temperature gradient across one or more pixels.

5. The method of claim 1, wherein the selected action is an additional amount of powder to add to the recoating mechanism, and wherein the method further comprises determining the additional amount based on the determined value.

6. The method of claim 1, further comprising comparing the determined value to a threshold to determine if the determined value indicates an error.

7. The method of claim 6, further comprising at least one of:
   emitting at least one of an audible or a visual warning if the comparison indicates an error; or
   directing additional powder to be added to the recoating mechanism when the comparison determines that an error has occurred.

8. The method of claim 6, further comprising determining a corrective action when the comparison determines that an error has occurred based on a type of scenario in which the error occurred.

9. The method of claim 8, wherein the type of scenario is a scenario in which large surfaces are scanned for building.

10. The method of claim 1, wherein the temperature characteristic is at least one of: a temperature of the powder, a temperature change of the powder, or a rate of change of the temperature of the powder.

* * * * *